(12) United States Patent
Perry et al.

(10) Patent No.: US 7,480,697 B2
(45) Date of Patent: Jan. 20, 2009

(54) METHOD AND APPARATUS USING ATTACHED HARDWARE SUBSYSTEM TO COMMUNICATE BETWEEN ATTACHED HOSTS

(75) Inventors: Larry Richard Perry, Gilroy, CA (US); Harold Glen Slone, Los Gatos, CA (US); William Frank Micka, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 10/157,461

(22) Filed: May 28, 2002

(65) Prior Publication Data
US 2003/0236910 A1 Dec. 25, 2003

(51) Int. Cl.
G06F 15/167 (2006.01)
(52) U.S. Cl. .............................. 709/213; 709/214; 711/4
(58) Field of Classification Search ............... 709/201, 709/234, 205, 213, 214; 711/4
See application file for complete search history.

(56) References Cited

U.S. PATENT DOCUMENTS

| | | | |
|---|---|---|---|
| 4,604,500 A | 8/1986 | Brown et al. ............ 179/18 ES |
| 4,633,392 A | 12/1986 | Vincent et al. .............. 364/200 |
| 5,153,884 A * | 10/1992 | Lucak et al. ................ 714/748 |
| 5,357,612 A | 10/1994 | Alaiwan ..................... 395/200 |
| 5,394,532 A * | 2/1995 | Belsan ........................ 711/114 |
| 5,459,836 A | 10/1995 | Whittaker et al. ...... 395/200.07 |
| 5,491,799 A | 2/1996 | Kruezenztein et al. . 395/200.08 |
| 5,606,703 A | 2/1997 | Brady et al. ................ 395/737 |
| 5,617,537 A | 4/1997 | Yamada et al. ......... 395/200.01 |
| 5,678,057 A | 10/1997 | Rostoker et al. ............ 395/800 |
| 5,790,804 A | 8/1998 | Osborne ................ 395/200.75 |
| 5,842,003 A | 11/1998 | Holmes et al. .............. 395/500 |
| 5,956,521 A * | 9/1999 | Wang ........................... 710/35 |
| 5,974,034 A * | 10/1999 | Chin et al. .................. 370/328 |
| 5,999,969 A | 12/1999 | Holmes et al. .............. 709/213 |

(Continued)

OTHER PUBLICATIONS

Kyoung S. Park/Andrew E. Johnson, Oct. 2000, 2000 ACM 1-58113-316-2/00/0010, 8-15.*

(Continued)

*Primary Examiner*—Phuoc Nguyen
*Assistant Examiner*—Asghar Bilgrami
(74) *Attorney, Agent, or Firm*—Harrington & Smith PC

(57) ABSTRACT

A method for sending a message from one host (16) to at least one other host, both of which are attached to a hardware subsystem (12) that is bidirectionally coupled to a mass data storage unit (14) includes (a) transferring a Send Message command through a channel (18) from a first attached host to the hardware subsystem, the Send Message command having at least one second attached host as an intended recipient; (b) buffering (20) at least a message payload portion of the Send Message command at the hardware subsystem and generating an unsolicited interrupt in the at least one second attached host; and (c) in response to the unsolicited interrupt, transferring a Request Message command through a channel from the at least one second attached host to the hardware subsystem for obtaining at least the message payload portion buffered at the hardware subsystem. The Send Message command may be a point-to-point message having a single other attached host as an intended recipient, or it may be a point-to-multipoint message having a plurality of other attached hosts as intended recipients. The hardware subsystem need have no knowledge of the message contents sent between hosts.

14 Claims, 2 Drawing Sheets

U.S. PATENT DOCUMENTS

| | | | | |
|---|---|---|---|---|
| 6,105,071 | A | 8/2000 | Desnoyers et al. | 709/237 |
| 6,151,621 | A * | 11/2000 | Colyer et al. | 709/204 |
| 6,205,508 | B1 | 3/2001 | Bailey et al. | 710/260 |
| 6,249,826 | B1 | 6/2001 | Parry et al. | 710/19 |
| 6,253,167 | B1 * | 6/2001 | Matsuda et al. | 703/11 |
| 6,256,677 | B1 | 7/2001 | Pribnow et al. | 709/250 |
| 6,263,397 | B1 | 7/2001 | Wu et al. | 710/268 |
| 6,263,406 | B1 * | 7/2001 | Uwano et al. | 711/141 |
| 6,321,289 | B1 | 11/2001 | Engfer et al. | 710/260 |
| 6,640,241 | B1 * | 10/2003 | Ozzie et al. | 709/204 |
| 6,647,468 | B1 * | 11/2003 | Woodward | 711/147 |
| 6,816,958 | B2 * | 11/2004 | Mashima | 711/202 |

OTHER PUBLICATIONS

James Begole, Mary Rosson; Flexible Collaboration Transparency: Supporting Worker Independence in Replicated Application-Sharing Systems, 1999 ACM 1073-0516/99/0600-0095.*

"Flexible Hardware Notification Mechanism", Research Disclosure, May 2000, pp. 956-957.

Davis, R.A. et al., "Software Event Subsystem", IBM Technical Disclosure Bulletin, vol. 38, No. 12, Dec. 1995, pp. 509-513.

Boggs, Jr., J.K., et al., "Input/Output Channel Status-Handling Mechanism", IBM Technical Disclosure Bulletin, vol. 19, No. 5, Oct. 1976, pp. 1663-1666.

"System/390 Command Reference 2105 Models E10, E20, F10, and F20", IBM Enterprise Storage Server, Second Edition, Jun. 2000.

* cited by examiner

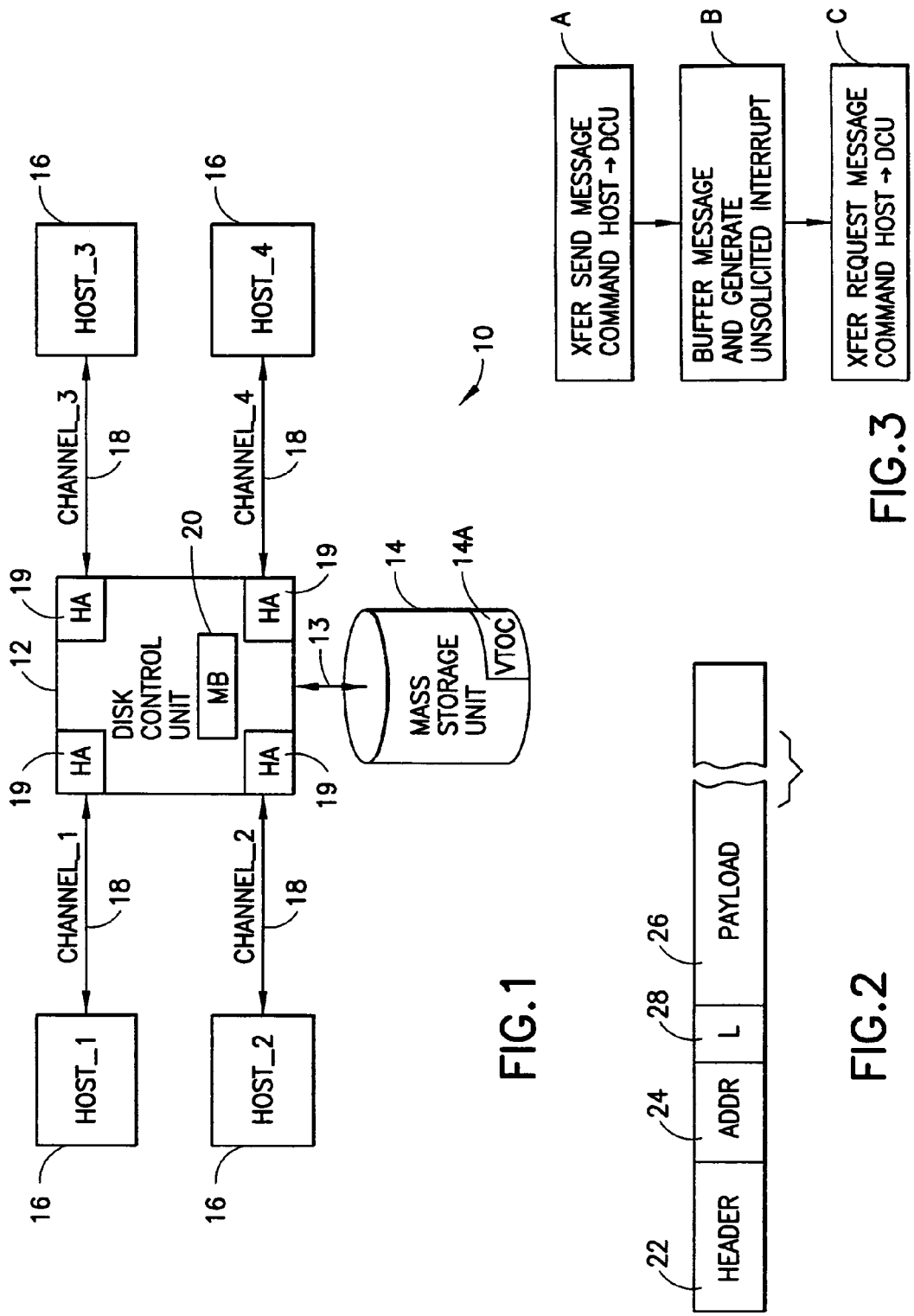

METHOD AND APPARATUS USING ATTACHED HARDWARE SUBSYSTEM TO COMMUNICATE BETWEEN ATTACHED HOSTS

TECHNICAL FIELD

These teachings relate generally to digital data processors and message passing techniques and, more specifically, relate to interrupt-driven inter-processor communication techniques.

BACKGROUND

In a multiple processor environment it is typically the case that some mechanism exists for providing inter-processor communication (IPC). Reference in this regard can be had, as an example, to U.S. Pat. No.: 5,459,836, "Inter-Processor Communication Net", by Bruce E. Whittaker et al. In this approach each processor in a network of processors is provided with a hardware IPC unit that connects via an IPC signal network to the IPC hardware units of each of the other processors. Each IPC hardware unit provides equal access to the IPC signal network, and also permits multiple signal messages to be received and buffered until serviced by the software of the receiving processor. The software of the receiving processor is made aware of the arrival of a message through an interrupt that is generated by the receiving processor's IPC hardware unit.

Other message passing techniques, in particular interrupt-driven message passing techniques, can be found in commonly-assigned U.S. Pat. No.: 6,105,071, as well as in U.S. Pat. Nos.: 4,633,392, 5,999,969 and 6,321,289.

The use of interrupt-driven message passing techniques is generally preferred over the alternative of polling some status register or flag for an indication that a new message has arrived, especially in real-time, event-driven data processing systems where low latencies are desired.

As may be appreciated, the approach adopted by Whittaker et al. and others exhibits a number of disadvantages. For example, each processor is required to be burdened with carrying the IPC hardware unit, thereby increasing cost, complexity and power consumption. Second, this approach requires the use of a separate signalling bus for implementing the IPC signal network that is connected between the IPC hardware units, thereby further increasing cost and complexity. Third, and related to the first disadvantage, the ability to connect different types of processors from different manufacturers, or even different models of processors from one manufacturer, can become problematic, as each processor must include a compatible IPC hardware unit.

A further layer of non-trivial complexity would be added if it were desired to bidirectionally connect the processors to another hardware unit, e.g., if each processor were to connected to an associated one of a host adapter interface of a common mass storage controller, such as a disk or a tape controller. This is especially true if the messages sent between these processors related to the common shared resource. In this case real-time synchronization issues may exist, making the use of some separate and independent inter-processor signalling bus and IPC units less than desirable.

It is presently known in the art that processors, also known as hosts, can be connected to an associated one of a host adapter interface of a common direct access storage device (DASD), and that a shared DASD dataset can be used for sending a message to the attached hosts from the DASD, in conjunction with polling of the DASD dataset by the attached hosts to discover the existence of the message. However, and as was noted above, the use of polling is not an efficient use of software or the processing power of the host CPU.

Prior to this invention, a satisfactory solution to the problem of sending messages between processors, when the processors are all bidirectionally connected to a common hardware unit, was not known to exist.

SUMMARY OF THE PREFERRED EMBODIMENTS

The foregoing and other problems are overcome, and other advantages are realized, in accordance with the presently preferred embodiments of these teachings.

This invention provides new and enhanced functionality for a system wherein a plurality of processors, also referred to as hosts, are each connected through a channel to an associated one of a host adapter interface of a common hardware system, such as a DASD or a tape hardware system. The common hardware system functions as a communication vehicle between the host software of all hosts that are attached to the common hardware system.

In the preferred embodiment the channel command repertoire is enhanced to include a Send Message command that accepts as input a message comprised of a byte string. In response to a receipt of the Send Message command from an attached source host the common hardware system notifies one or more intended attached recipient hosts of the existence of the message using an unsolicited interrupt sent through the channels of the recipient hosts. A Read Message command is then sent through the channel from each attached recipient host to the common hardware unit to retrieve the message. The use of this message passing technique does not require the common hardware unit to have any knowledge of the content of a particular message, and no additional hardware or signal buses are required in either the attached hosts or the common hardware unit. The use of the unsolicited interrupt by the common hardware unit to notify the attached recipient host(s) of the existence of the message eliminates any need to perform polling, thereby enhancing software efficiency.

A method is disclosed for sending a message from one host to at least one other host, both of which are attached to a hardware subsystem that is bidirectionally coupled to a mass data storage unit. A data processing system that operates in accordance with the method is also described.

The method includes (a) transferring a message origination command through a channel from a first attached host to the hardware subsystem, the message origination command having at least one second attached host as an intended recipient; (b) buffering at least a message payload portion of the message origination command at the hardware subsystem and generating an interrupt in the at least one second attached host; and in response to the generated interrupt, (c) transferring a message retrieval command through a channel from the at least one second attached host to the hardware subsystem for retrieving at least the message payload portion buffered at the hardware subsystem. The message origination command may be referred to as a Send Message command that may be a point-to-point message having a single other attached host as an intended recipient, or it may be a point-to-multipoint message having a plurality of other attached hosts as intended recipients.

Also disclosed in accordance with this invention is a method for modifying shared data stored on a mass data storage unit of a data processing system that includes a hardware subsystem and a plurality of hosts that are each bidirectionally coupled to the hardware subsystem. The hardware subsystem is bidirectionally coupled to the mass data storage unit. The method includes (a) transferring a point-to-multipoint message origination input/output command from a first attached host to the hardware subsystem, the message origination command specifying a plurality of other attached hosts as intended recipients and including a notification of a modification made to shared data stored on said mass data storage unit; (b) buffering at least a portion of the message origination command at the hardware subsystem and generating an interrupt in all of the specified intended recipient hosts; and in response to the generated interrupt, (c) sending a message retrieval input/output command from each of the specified intended recipient hosts to the hardware subsystem for retrieving the buffered message from the hardware subsystem and thereby receiving the notification of the modification to the shared data. The shared data could include a disk volume table of contents (VTOC).

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 1 is a simplified high level block diagram of a data processing system that is suitable for practicing the teachings of this invention;

FIG. 2 shows an example of the format of the Send Message command;

FIG. 3 is a logic flow diagram of a method in accordance with this invention.

DETAILED DESCRIPTION OF PREFERRED EMBODIMENTS

Figure 4:
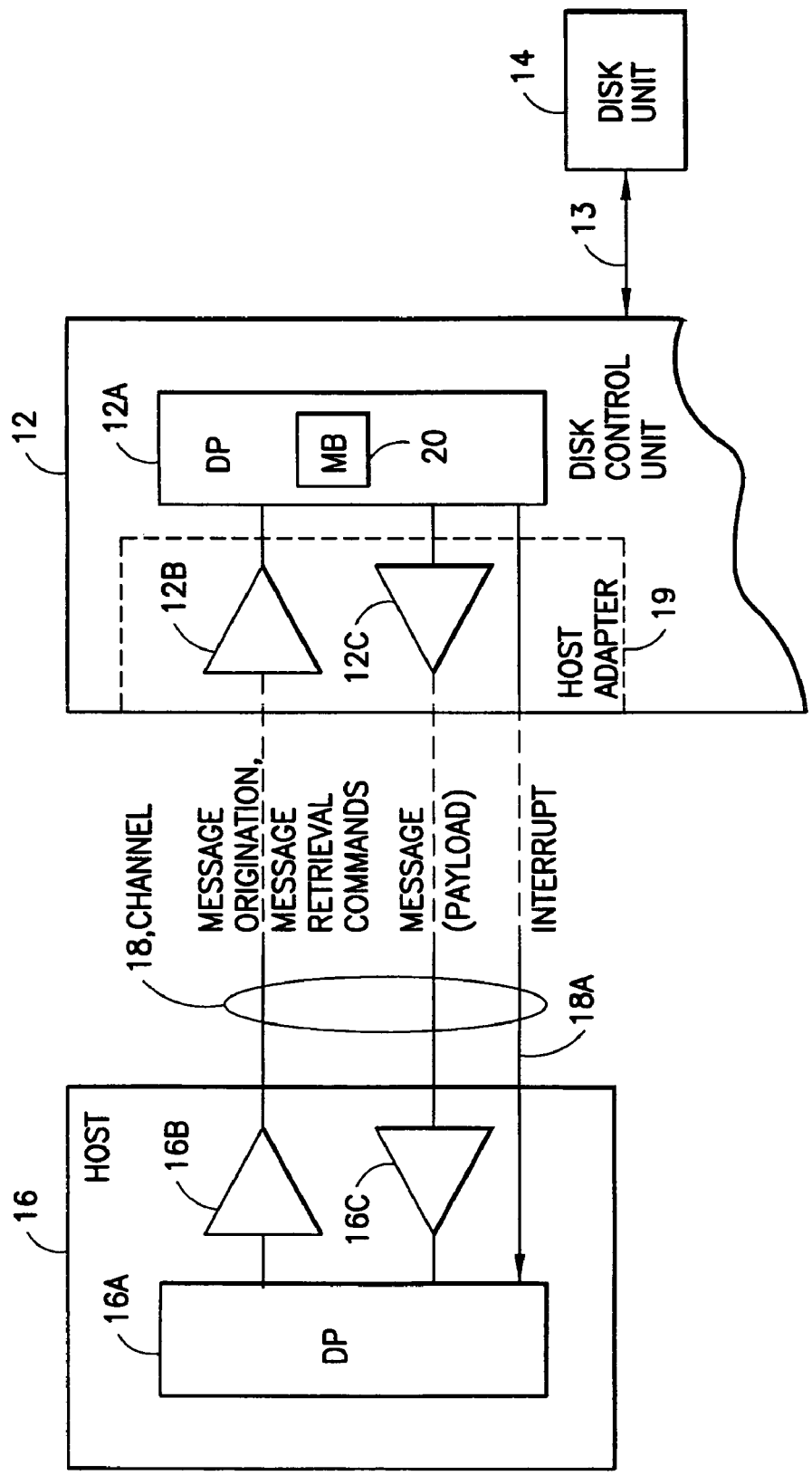
FIG. 4 is a simplified block diagram showing the interface between one host and the disk control unit, also referred to herein as a hardware subsystem.

Reference is made to FIG. 1 for showing a data processing system 10, which may also be referred to as a storage area network. The system 10 includes, in the illustrated embodiment, a hardware subsystem that can be embodied as a Disk Control Unit (DCU) 12. The DCU 12 is assumed to be bidirectionally connected to a Mass Storage Unit (MSU) 14. The MSU 14 may be a single large disk, although in practice it will contain a plurality of disk drives arranged in ranks or arrays. The ranks of disks can be configured in a RAID configuration, e.g., a RAID 5 configuration, or as non-RAID arrays. While shown in FIG. 1 as a simple bidirectional connection 13, in actuality the interface between the DCU 12 and the MSU 14 can be made through a plurality of device adapters (DAs) in a manner known in the art.

Connected to the DCU 12 are a plurality of host processors 16, four of which are shown for convenience and designated HOST_1, HOST_2, HOST_3 and HOST_4. More or less than four hosts 16 can be used, and in one exemplary embodiment there may be up to 16 hosts connected to the DCU 12. The hosts 16 may be the same type of data processor, or each may be a different type of data processor from the same manufacturer, or each may be a different type of data processor from different manufacturers. As an example, the hosts 16 can include data processors and servers available from the assignee of this patent application such as, but not limited to: a System/390® computer server system running OS/390®, a Reduced Instruction Set Computer (RISC) system such as one known as the RS/600™ system, and an xSeries™ system such as the NetFinity® system, Registered Trademarks and Trademarks of the International Business Machines Corporation. Data processors and servers manufactured by others can also be used and connected as hosts to the DCU 12.

The hosts 16 are connected to the DCU 12 through channels 18, designated for convenience as CHANNEL_1, CHANNEL_2, CHANNEL_3 and CHANNEL_4. Each channel 18 is terminated at the DCU 12 with a Host Adapter (HA) 19, which can take the form of, for example, a SCSI input/output (I/O) interface or an Enterprise Systems Connection (ESCON®) fiber I/O interface, a Registered Trademark of the International Business Machines Corporation.

One suitable, but non-limiting, embodiment for the DCU 12 is a TotalStorage Enterprise Storage Server™ (ESS), a Trademark of the International Business Machines Corporation.

In practice, communication over the channels 18 takes place using defined commands, such as Read and Write commands. In this manner individual ones of the hosts 16 can read data from and write data to the MSU 14. Reference with regard to one suitable embodiment of the command set can be found in a document entitled "System/390 Command Reference 2105 Models E10, E20, F10, and F20", SC26-7298-01, copyright 1999, 2000, International Business Machines Corporation, incorporated by reference herein and referred to hereafter for convenience as the "Command Reference".

As is defined in the Command Reference, the command set for use by the hosts 16 is divided into functional categories: Addressing and Control Commands (e.g., Define Extent, Locate Record, Seek); Read Commands (e.g., Read Record Zero, Read Data, Read Track); Search Commands (e.g., Search HA Equal, Search ID Equal, Search Key Equal); Write Commands (e.g., Write Record Zero, Write Data, Erase); Sense Commands (Sense and Sense ID); Miscellaneous Commands (e.g., No-Operation, Read Configuration Data, Read Device Characteristics); Path Control Commands (e.g., Device Reserve, Device Release, Set Path Group ID); and Subsystem Commands (Set Cache Storage Mode, Perform Subsystem Function, Set Subsystem Function, Read Subsystem Data and Read Message ID).

The Read Message ID is used to read a Message Identifier that is assigned by the subsystem of the DCU 12 to a Set Subsystem Mode or a Perform Subsystem Function command that requests notification when an asynchronous operation is complete. The Read Message ID command is currently specified to be chained directly only from a Set Subsystem Mode or Perform Subsystem Function command that requested a Message. The data returned by this command is located in a Message Buffer 20 of the DCU 12 (see generally pages 142-145 of the above noted Command Reference document.)

In accordance with the teachings of this invention the command set is enhanced by providing the ability for a host 16 to send a message to at least one other host 16. The message can be addressed so as to be sent in a point-to-point manner, for example from HOST_1 to HOST_4, or in a point-to-multipoint (broadcast) manner, for example from HOST_1 to each of HOST_2, HOST_3 and HOST_4. The host-to-host (HTH) message passing procedure in accordance with this invention is mediated by the DCU 12. The DCU 12 receives and buffers a Send Message command that includes the message body, notifies the intended recipient host(s) of the existence of the message, preferably by generating an interrupt in each recipient host, more preferably by generating an unsolicited interrupt, using conventional circuitry, in each recipient host, and then responds to a Read Message command from the intended recipient host(s) to provide access to the buffered message, such as through the Message Buffer 20. The DCU 12 need have no knowledge of the content of the message passed in this manner, as the DCU 12 need not read, interpret or otherwise act on the message payload.

FIG. 2 shows an example of the format of the Send Message command. A Header 22 identifies the message as the Send Message command, an Address field 24 identifies the recipient(s) of the message, and a message payload portion 26 contains the byte string that forms the body of the message. The message payload portion 26 may comprise from one byte or portion of a byte up to any suitable number of bytes. If the Send Message command is defined as a variable length message then a message Length field 28 can be included. If the Send Message command is defined instead as a fixed length message then the message Length field 28 can be removed, although in this case it may be desirable to provide a field for indicating when the message content must be continued over one or more additional instances of the Send Message command.

Note that the exemplary message format of FIG. 2 includes the Address field 24 for identifying one or more recipient hosts 16, such as by the number of the Host Adapter 19 that they are connected to. However, the Send Message command may be defined to be in all instances a broadcast type message, where all other hosts 16 are notified of its existence, enabling all attached hosts 16 to retrieve and read the message, and to simply ignore the message or to act on it, as the situation dictates. In this case the Address field 24 may also be eliminated, as the Send Message command is by default a broadcast type message.

It should be apparent then that as a minimum the Send Message command includes the Header 22, that identifies the command to the DCU 12 as the Send Message command, and the payload portion 26.

Referring to FIG. 3, in accordance with a method of this invention for sending a message from one host 16 to at least one other host 16 the following process steps are executed. At Step A the method transfers a message origination command, such as the Send Message command, through a channel 18 from a first attached host 16 to the hardware subsystem, such as the DCU 12. The Send Message command has at least one second attached host 16 as an intended recipient. At Step B the method buffers at least the message payload portion 26 of the Send Message command at the hardware subsystem, and generates an interrupt, preferably an unsolicited interrupt, in the at least one second attached (recipient) host 16. In response to the interrupt, Step C transfers a message retrieval command, such as the Request Message command, from the at least one second attached host 16 to the hardware subsystem 12 for obtaining at least the message payload portion 26 buffered at the hardware subsystem 12. The message origination and message retrieval commands are send as I/O commands over the respective channels 18.

Those skilled in the art will recognize that this invention further encompasses computer executable software that resides in the hosts 16, as well as the DCU 12, for executing the steps of the foregoing method.

The messages sent between the hosts 16 can convey any suitable type of information. As but one non-limiting example, one of the hosts 16 may perform an operation to modify a Volume Table of Contents (VTOC) 14A that resides on the MSU 14 (one VTOC per volume). After performing this operation the host 16 generates a global Send Message I/O command to all of the other attached hosts 16 for informing them of the modification to the VTOC 14A. In response to this notification the other hosts 16 will preferably re-read the modified Volume Table of Contents 14A so that all of the hosts 16 have the latest information regarding that particular volume. In general, this technique can be used by one host 16 to notify the other hosts 16 of any change made to a particular volume, and even more generally to notify the other hosts 16 of a change made to any shared data in the MSU 14.

In other embodiments the Send Message command need not concern the MSU 14 or the storage system at all, but could instead convey some enterprise-related information. System and/or enterprise-related diagnostic information could also be exchanged between the hosts 16 using the Send Message command that is mediated by the DSU 12.

FIG. 4 is a simplified block diagram showing the interface between one host 16 and the disk control unit 12, also referred to herein as the hardware subsystem. The host 16 (only one of which is shown) is bidirectionally coupled to the hardware subsystem 12 through the respective host adapter 19 and channel 18. The hardware subsystem 12 is bidirectionally coupled 13 to the mass data storage unit, such as the disk unit 14, that is shared by the plurality of hosts 16. The host 16 and hardware subsystem 12 each contain a data processor (DP) 16A and 12A, respectively, that operate in accordance with stored programs for causing the host DP 16A in the attached host 16 to transfer the message origination command to a message receiver 12B through the associated channel 18 via a message transmitter 16B. The message origination command specifies at least one second attached host 16 as an intended recipient. The hardware subsystem 12 includes the message buffer 20 for buffering at least the message payload portion 26 of the message origination command received through the channel 18. The DP 12A of the hardware subsystem 12 executes a stored program for interrupting via at least one line 18A a specified recipient attached host 16. The DP 16A, when the host 16 is a specified recipient of a buffered message payload portion 26, is responsive to the interrupt to transfer of a retrieve message command through the channel 18 to the hardware subsystem 12. In response, the hardware subsystem 12 retrieves the message payload portion 26 from the message buffer 20, and sends it through the channel 18 to the specified recipient host 16 via a message payload transmitter 12C and a message payload receiver 16C.

It is also within the scope of these teachings, as was explained above, to dynamically change information regarding disk volumes by sending a global or broadcast-type message from one of the hosts 16 as an I/O command. It is further within the scope of these teachings to send a message or messages to all hardware coupled to the DSU 12 as an I/O command.

While described herein in the context of certain presently preferred embodiments of this invention, it should be realized that the disclosed embodiments are exemplary, and are not to be construed in a limiting sense upon the practice and implementation of the teachings of this invention. For example, the message names Send Message and Request Message were provided for convenience as being generally descriptive of the function performed. However, in other embodiments these messages could have different names, e.g., Host-to-Host Communication and Retrieve Host Communication as but just two examples. Other fields could be included in the messages than just those shown in FIG. 2, such as an error detection and correction field, a message source ID field, a field for indicating whether a message received acknowledgment is requested from the recipient host(s) 16, and so forth, as is generally known in the messaging art.

What is claimed is:

1. A method for sending a message comprising:

transferring a message origination command through a channel from a first attached host to a hardware subsystem which comprises a part of a storage area network and that is bidirectionally coupled to a mass data storage unit, the message origination command having at least one second attached host as an intended recipient;

buffering at least a message payload portion of the message origination command in the hardware subsystem and generating an unsolicited interrupt from the hardware subsystem to the at least one second attached host; and in response to the generated unsolicited interrupt, transferring a message retrieval command through a channel from the at least one second attached host to the hardware subsystem for retrieving at least the message payload portion buffered at the hardware subsystem, where information regarding disk volumes of the mass data storage unit are dynamically changed by sending the message origination command from the first host as an input/output command.

2. A method as in claim 1, where the message origination command comprises a point-to-point message having a single other attached host as an intended recipient.

3. A method as in claim 1, where the message origination command comprises a point-to-multipoint message having a plurality of other attached hosts as intended recipients.

4. A method as in claim 1, where the message origination command comprises a channel input/output command that is addressed to a single other attached host.

5. A method as in claim 1, where the message origination command comprises a channel input/output command that is addressed to a plurality of other attached hosts.

6. A method as in claim 1, where the message origination command comprises a channel input/output command that is addressed to all other attached hosts.

7. A method as in claim 1, where the mass data storage unit comprises at least one disk that is used by each of the attached hosts.

8. A method as in claim 1, where the mass data storage unit comprises at least one disk, and where the message origination command is sent when changing shared information that is stored on the at least one disk.

9. A method for sending a message comprising:

transferring a message origination command through a channel from a first attached host to the hardware subsystem which comprises a part of a storage area network and that is bidirectionally coupled to a mass data storage unit, the message origination command specifying ones of the plurality of other hosts as an intended recipients;

buffering at least a message payload portion of the message origination command at the hardware subsystem and generating an unsolicited interrupt from the hardware subsystem in each of the specified ones of the plurality of other hosts; and in response to the generated unsolicited interrupt, transferring a message retrieval command from each of the specified ones of the plurality of other hosts for retrieving at least the message payload portion buffered at the hardware subsystem, where information regarding disk volumes of the mass data storage unit are dynamically changed by sending the message origination command from the first host as an input/output command.

10. A method as in claim 1, where the message origination command comprises a variable length message.

11. The method as in claim 1, where the information regarding disk volumes is a disk volume table of contents.

12. The method as in claim 1, where the message payload comprises a notification that changes have been made to a disk volume of the mass data storage unit.

13. The method as in claim 9, where the information regarding disk volumes is a disk volume table of contents.

14. The method as in claim 9, where the message payload comprises a notification that changes have been made to a disk volume of the mass data storage unit.

* * * * *